US006175563B1

(12) United States Patent
Miloslavsky

(10) Patent No.: US 6,175,563 B1
(45) Date of Patent: *Jan. 16, 2001

(54) PARALLEL DATA TRANSFER AND SYNCHRONIZATION IN COMPUTER-SIMULATED TELEPHONY

(75) Inventor: Alec Miloslavsky, Hillsborough, CA (US)

(73) Assignee: Genesys Telecommunications Laboratories, Inc., San Francisco, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/947,774

(22) Filed: Oct. 9, 1997

Related U.S. Application Data

(60) Division of application No. 08/928,410, filed on Sep. 12, 1997, now Pat. No. 6,064,667, which is a continuation-in-part of application No. 08/866,357, filed on May 30, 1997, now Pat. No. 5,940,496, which is a continuation-in-part of application No. 08/802,660, filed on Feb. 19, 1997, now Pat. No. 5,946,387, which is a continuation-in-part of application No. 08/797,418, filed on Feb. 10, 1997.

(51) Int. Cl.[7] .................................................. H04J 3/12
(52) U.S. Cl. ............................................ 370/352; 370/356
(58) Field of Search ................................... 370/352, 353, 370/354, 355, 356, 400, 401, 402, 270; 379/265, 266, 309, 200, 201, 202, 211, 212, 220, 221, 93.23

(56) References Cited

U.S. PATENT DOCUMENTS

| 5,724,412 | * | 3/1998 | Srinivasan | 379/93.23 |
| 5,757,904 | * | 5/1998 | Anderson | 379/309 |
| 5,793,861 | * | 11/1998 | Haigh | 379/265 |

* cited by examiner

Primary Examiner—Huy D. Vu
(74) Attorney, Agent, or Firm—Donald R. Boys; Central Coast Patent Agency

(57) ABSTRACT

An Internet Protocol Telephony Network (IPNT) call-routing system has a first processor adapted for receiving and initial processing of incoming IPNT calls from a wide area network (WAN). At the first processor information about callers is elicited. Calls are routed to remote processors for distribution to individual stations over the WAN, and information about the callers is sent to the same remote processors by a data link separate from the WAN. The WAN may be the Internet, and caller information may be used at the remote processors for further routing, and to retrieve customer information from available databases, which may be displayed on video displays at workstations to which the calls are routed.

11 Claims, 7 Drawing Sheets

PARALLEL DATA TRANSFER AND SYNCHRONIZATION IN COMPUTER-SIMULATED TELEPHONY

CROSS-REFERENCE TO RELATED DOCUMENTS

The present patent application is a Divisional application of patent application Ser. No. 08/928,410 filed on Sep. 12, 1997, now U.S. Pat. No. 6,064,667 which is a Continuation-in Part (CIP) of application Ser. No. 08/866,357, filed on May 30, 1997, and now U.S. Pat. No. 5,940,496 which is a CIP of application Ser. No. 08/802,660 filed on Feb. 19, 1997, now U.S. Pat. No. 5,946,387, which is a CIP of application Ser. No. 797,418 filed on Feb. 10, 1997. The prior applications are incorporated herein in their entirety by reference.

FIELD OF THE INVENTION

The present invention is in the area of telephone call processing and switching, and pertains more particularly to intelligent call-routing systems.

BACKGROUND OF THE INVENTION

Telephone call processing and switching systems are, at the time of the present patent application, relatively sophisticated, computerized systems, and development and introduction of new systems continues, including Internet-based telephony systems, which are known in the art as Internet Protocol Telephony (IPT) systems. It is also true that the older telephony call-switching networks, and the more recent Internet telephony systems are beginning to merge, and many believe will one day be completely merged.

Much information on the nature of such hardware and software is available in a number of publications accessible to the present inventors and to those with skill in the art in general. For this reason, much minute detail of known systems is not reproduced here, as to do so would obscure the facts of the invention.

One document which provides considerable information on intelligent networks is "ITU-T Recommendation Q.1219, Intelligent Network User's Guide for Capability Set 1", dated April, 1994. This document is incorporated herein by reference. There are similarly many documents and other sources of information describing and explaining IPT systems, and such information is generally available to those with skill in the art.

At the time of filing the present patent application there continues to be remarkable growth in telephone-based information systems, including IPT systems, wherein conventional telephone functions are provided by computer hardware and software. Recently emerging examples are telemarketing operations and technical support operations, among many others, which have grown apace with development and marketing of, for example, sophisticated computer equipment. More traditional are systems for serving customers of large insurance companies and the like. In some cases organizations develop and maintain their own telephony operations with purchased or leased equipment, and in many other cases, companies are outsourcing such operations to firms that specialize in such services.

A large technical support operation serves as a good example in this specification of the kind of applications of telephone equipment and functions to which the present inventions pertain and apply, and a technical support organization may be used from time to time in the current specification for example purposes. Such a technical support system, as well as other such systems, typically has a country-wide or even world-wide matrix of call centers for serving customer's needs. Such call center operations are more and more a common practice to provide redundancy and decentralization.

In a call center, a relatively large number of agents typically handle telephone communication with callers. Each agent is typically assigned to a telephone connected to a central switch, which is in turn connected to a public-switched telephone network (PSTN), well-known in the art. The central switch may be one of several types, such as Automatic Call Distributor (ACD), Private Branch Exchange (PBX), or PSTN. Each agent also typically has access to a computer platform having a video display unit (PC/VDU) which may be adapted, with suitable connectivity hardware, to process Internet protocol telephony calls.

At the time of the present patent application intelligent telephony networks and IP networks share infrastructure to some extent, and computer equipment added to telephony systems for computer-telephony integration (CTI) are also capable of Internet connection and interaction. There is therefore often no clear distinction as to what part of a network is conventional telephony, and what part is IPT.

In conventional telephony systems, such as publicly-switched telephony networks (PSTNs), there are computerized service control points (SCPs) that provide central routing intelligence (hence intelligent network). IPNs do not have a central router intelligence, such as a SCP. IPNs, however, have multiple Domain Name Servers (DNS), whose purpose is basically the same as the routers in intelligent networks, which is controlling the routing of traffic. Instead of telephony switches (PBXs), IP switches or IP routers are used.

An organization having one or more call centers for serving customers typically provides one or more telephone numbers to the public or to their customer base, or both, that may be used to reach the service. In the case of an IP network, a similar organization may provide an IP address for client access to services, and there are a number of ways the IP address may be provided. Such numbers or addresses may be published on product packaging, in advertisements, in user manuals, in computerized help files, and the like.

Routing of calls in intelligent networks, then, may be on several levels. Pre-routing may be done at SCPs and further routing may be accomplished at individual call centers. As described above a call center in an intelligent telephony system typically involves a central switch The central switch is typically connected to a publicly-switched telephone network (PSTN), well-known in the art. Agents, trained (hopefully) to handle customer service, man telephones connected to the central switch. This arrangement is known in the art as Customer Premises Equipment (CPE).

If the call center consists of just a central switch and connected telephone stations, the routing that can be done is very limited. Switches, although increasingly computerized, are limited in the range of computer processes that may be performed. For this reason additional computer capability in the art has been added for such central switches by connecting computer processors adapted to run control routines and to access databases. The processes of incorporating computer enhancement to telephone switches is known in the art as Computer Telephony Integration (CTI), and the hardware used is referred to as CTI equipment.

In a CTI system telephone stations connected to the central switch may be equipped also with computer terminals, as described above, so agents manning such stations may have access to stored data as well as being linked to incoming callers by a telephone connection. Such stations may be interconnected in a network by any one of several known network protocols, with one or more servers also connected to the network one or more of which may also be connected to a processor providing CTI enhancement, also connected to the central switch of the call center. It is this processor that provides the CTI enhancement for the call center. Agents having access to a PC/VDU connected on a LAN to a CTI processor in turn connected to a telephony switch, may also have multi-media capability, including Internet connectivity, if the CTI processor or another server connected to the LAN provides control for Internet connectivity for stations on the LAN.

When a telephone call arrives at a call center, whether or not the call has been pre-processed at a SCP, typically at least the telephone number of the calling line is made available to the receiving switch at the call center by a telephone carrier. This service is available by most PSTNs as caller-ID information in one of several formats. If the call center is computer-enhanced (CTI) the phone number of the calling party may be used to access additional information from a database at a server on the network that connects the agent workstations. In this manner information pertinent to a call may be provided to an agent.

Referring now to the example proposed of a technical-service organization, a system of the sort described herein will handle a large volume of calls from people seeking technical information on installation of certain computer-oriented equipment, and the calls are handled by a finite number of trained agents, which may be distributed over a decentralized matrix of call centers, or at a single call center. In examples used herein illustrating various aspects of the present invention, the case of a decentralized system of multiple call centers will most often be used, although, in various embodiments the invention will also be applicable to individual call centers.

Even with present levels of CTI there are still problems in operating such call centers, or a system of such call centers. There are waiting queues with which to contend, for example, and long waits may be experienced by some callers, while other agents may be available who could handle callers stuck in queues. Other difficulties accrue, for example, when there are hardware or software degradations or failures or overloads in one or more parts of a system. Still other problems accrue due to known latency in conventional equipment. There are many other problems, and it is well recognized in the art, and by the general public who have accessed such call centers, that there is much room for improvement in the entire concept and operation of such call center systems. It is to these problems, pertaining to efficient, effective, timely, and cost-effective service to customers (users) of call center systems that aspects and embodiments of the present invention detailed below are directed.

Further to the above, IPNT systems at the time of the present patent application are much less sophisticated in provision of intelligent routing, parallel data transfer, supplemental data provision to agents, and the like. The advantages that embodiments of the invention described below bring to conventional telephony systems may also in most cases be provided to ITP systems and systems in which the form of the network between conventional telephony and IP protocol is blurred.

SUMMARY OF THE INVENTION

In a preferred embodiment a computerized Internet Protocol Network Telephony (IPNT) call center is provided, comprising a first processor coupled to a wide area network (WAN) and to a second data link, and adapted to receive and distribute incoming IPNT calls from the WAN; and a plurality of computers at operator workstations, each computer having a video display (PC/VDU) coupled to the first processor, the plurality of computers and the first processor connected on a local area network (LAN). The first processor is adapted to receive, on the second data link, data associated with the incoming IPNT calls, and to distribute the incoming calls to individual ones of the computers at workstations at least partially based on the data received. The first processor may communicate on the WAN by TCP/IP protocol. There may also be a customer information database connected to the LAN, and the first processor may match the data received with information in the database, retrieve information from the database related to callers, and distribute the caller information to workstations to which associated calls are distributed. The WAN may be the Internet.

In another embodiment of the invention an Internet-Protocol Network Telephony (IPNT) call-routing system is provided, comprising a first processor connected to a wide area network (WAN) and to a second data network, and adapted for receiving incoming IPNT calls from the WAN; and a remote call center having a second processor connected to the WAN and to the second data network, and connected on a local area network (LAN) to a plurality of computers at operator workstations, each computer having a video display unit (PC/VDU). In this embodiment the second processor is adapted to receive, on the second data link, data associated with the incoming IPNT calls, and to distribute the incoming calls to individual ones of the computers at workstations at least partially based on the data received. Preferably the first and second processors communicate on the WAN by TCP/IP protocol. There may further be a caller information database connected on the LAN, wherein the second processor matches the data received with information in the database, retrieves information from the database related to callers, and sends the information retrieved to workstations to which associated calls are distributed. The WAN may be the Internet or other network, such as a company Intranet.

In yet another embodiment of the invention an initial Internet Protocol Network Telephony (IPNT) call processing system adapted for routing incoming IPNT calls to selected destinations is provided, comprising a first processor connected to a wide area network (WAN) and adapted for receiving incoming IPNT calls; and a second data link connected to the first processor. In this embodiment the first processor collects data from a caller, forwards the incoming calls to a second processor at a call center, and forwards the collected data over the separate data link to the second processor. The elicited information in some embodiments is forwarded in TCP/IP protocol.

In another embodiment a method for routing an incoming Internet-Protocol Network Telephony (IPNT) call from a caller to a selected destination is provided, comprising steps of (a) receiving the incoming IPNT call from a wide area network (WAN); (b) eliciting information about the caller; (c) selecting a destination for the incoming call; and (d) forwarding the incoming call over a wide area network (WAN) to a processor at the selected destination, while sending the information about the caller to the processor at the at the selected destination over a separate data link from the WAN.

In embodiments of the invention as taught in enabling detail below, IPNT calls are, for the first time, initially processed with information elicited from callers to aid in routing and processing, and the elicited data iis forwarded to call centers by a path separate from the path over which the calls are forwarded, providing numerous advantages in call routing and processing, especially for purposes of call-center service systems.

BRIEF DESCRIPTION OF THE DRAWING FIGURES

DESCRIPTION OF THE PREFERRED EMBODIMENTS

General Description

Figure 1:
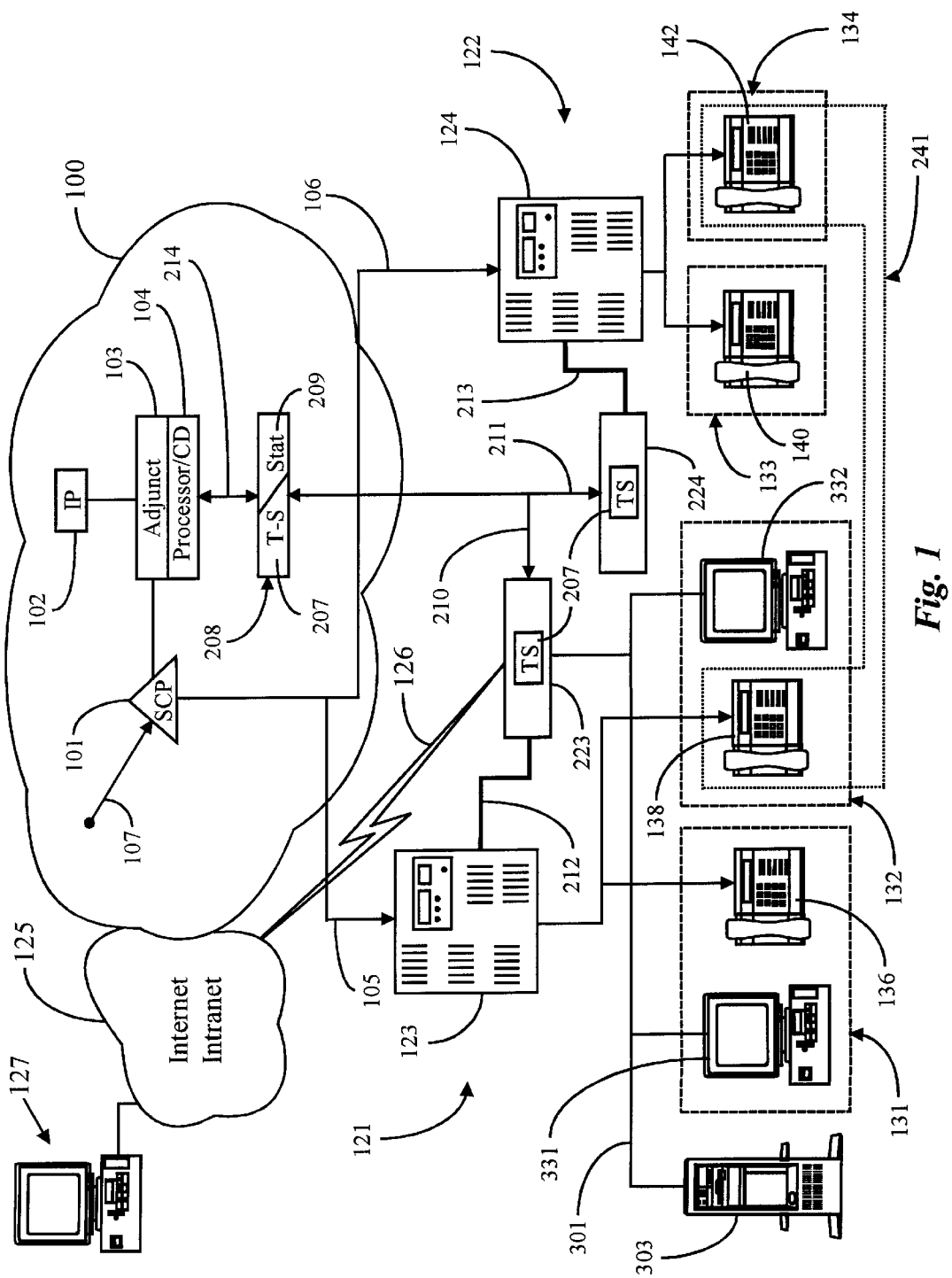
FIG. 1 is a system diagram of a call-routing system according to a preferred embodiment of the present invention.

FIG. 1 is a system diagram of a call-routing system according to a preferred embodiment of the present invention, comprising two call centers 121 and 122. In this embodiment there may be many more than the two call centers shown, but two is considered by the inventors to be sufficient to illustrate embodiments of the invention. Each of call centers 121 and 122 includes a telephony switch (switch 123 for center 121 and switch 124 for center 122) providing routing to individual agent stations.

Call centers 121 and 122 in FIG. 1 are CTI-enhanced by virtue of a processor connected by a high-speed data link to the associated call center switch. At call center 121, processor 223 is connected by link 212 to switch 123, and at call center 122, processor 224 is connected to switch 124 by link 213. Each processor 223 and 224 includes an instance of a CTI application 207 known to the inventors as T-Server (T-S) 207. Further, each processor 223 and 224 at each call center is in turn connected to a local area network (LAN). For example LAN 301 is shown connected to processor 223 in FIG. 1. No equivalent network is shown at call center 122 for the sake of simplicity, although the architecture described herein for call center 121 may be presumed to be extant at call center 122 and other call centers as well.

Each call-in center 121 and 122 included in this example also includes at least two telephone-equipped agent workstations, which also each have a user interface (IF) to the associated LAN. Workstation 131 at center 121 for example has a telephone 136 connected to central switch 123, and a proximate user interface 331 to network 301. Interface 331 may be a PC, a network terminal, or other system, and typically provides a video display unit (VDU) and input apparatus (keyboard/pointer for example) allowing an agent to view data and make appropriate inputs. For descriptive purposes the computer workstation at each agent station will be termed a PC/VDU.

In like manner workstation 132 illustrated has a telephone 138 connected to central switch 123 and a proximate PC/VDU 332 providing an agent with display and input capability. For call enter 122 workstations 133 and 134 are shown having respectively telephones 140 and 142 connected to central switch 124, in turn connected to processor 224 by link 213. A local area network (LAN) equivalent to LAN 301 at call center 121 is not shown for call center 122 for the sake of simplicity in illustration, and PC/VDUs for the agents are similarly not shown for call center 122.

As is true with LANs in general, servers of various sorts may be connected to LAN 301 at call center 121. In FIG. 1 a data server 303, in this instance including a customer database is shown connected to LAN 301. A similar database server may also be connected to a LAN at call center 122. The customer database will typically comprise such as the names, addresses, and other information relating to customers for whom the call center is established, and also in many instances resource information for agents to access in helping callers with their problems.

In some embodiments of the present invention to be described in enabling detail below, agents at agent stations interact verbally with clients via the telephones at the workstations, and the PC/VDUs are utilized for such as screen pops with information about clients, scripts for agents to follow in aiding clients, and technical information and other data needed in interacting with clients. In other embodiments the PC/VDU equipment may be used more comprehensively, such as for video-conferencing with clients, receiving, storing and responding to electronic documents such as e-mail, and for Internet protocol telephony (IPT). In the case of Internet-based and related services, the CTI processor, or any other processor connected to the LAN at a call center may be Internet-connected, and provided with the necessary hardware and software known in the art for providing Internet access to agent's PC/VDUs also connected on the LAN at the call center.

Because of differences in conventional telephony service (CTS) and Internet telephony, and because the overt mechanism in both systems is modeled on the perceived, traditional model of telephone calls, a convention is necessary to distinguish. In the descriptions that follow, for this reason, CTS is referred to as intelligent network telephony (INT) and Internet telephony is referred to as Internet protocol network telephony (IPNT). This is not intended to imply that all CTS systems described herein are prior art, or that all IPNT systems described are inventive and unique. These distinctions will be made below as much as possible in every case described.

The main difference between CTS and IPNT is in the residence of network intelligence. In INT the firmware generating intelligence is mainly residing in network processors, where in IPNT, the firmware for the intelligence mostly resides in the end-equipment, whereas the network is often referred to as dumb network. Since most of the features of present inventions reside in the CTI server, known to the inventors as T-Server, and from there control certain network functions in certain ways, it is mostly irrelevant to their application, where the actual intelligence resides.

One of the variables in routing incoming calls, whether in INT or IPNT, is the skill set of each agent assigned to a workstation. This skill set may include a unique set of skills, resources and knowledge, such as, but not limited to, language capability, access to technical information, and specific training. In routing calls in a conventional system both at the network and at the call center level, the system and/or network needs to know such things as the status of any or all call centers, the availability of each agent, the skill set of each agent, the number of incoming calls, the number of calls waiting to be answered, and so forth. In a system using Internet protocol telephony for access to agents at call centers the same kinds of information needs to be available, and there needs to be also a way to route IPNT calls based on the information.

Referring again to FIG. 1, and specifically to call center 121, there are a number of ways that PC/VDUs 331 and 332 may have access to the Internet, and thereby to IPNT calls as well as to data services and the like provided at the call center. For example, any one of PC/VDUs at the call center, or other call center such as center 122, may have a modem connected to a phone line and software to connect to an Internet service provider. More likely, considering only call center 121. Processor 223 or another processor or IP router connected to LAN 301 may have Internet access and provide access to stations on the LAN. In specific aspects of the invention described below, Internet access and IPNT telephony relative to the inventive concepts are discussed in more detail.

In this example, control routines executable on processor 223 for call center 123 may access algorithms providing call routing at the call center level, and may also access data from data server 303 for use in routing decisions and the like. Similar routines run on processor 224 serving call center 122. In specific aspects of the invention described below, routing of IPNT calls will be discussed as well.

Telephone calls are routed to call centers 121 and 122 over conventional telephony lines 105 and 106 respectively from remote origination points (a customer seeking technical aid has placed a call, for example, to an advertised or otherwise provided 1-800 number). Cloud 100 represents the intelligent telephone network system, and is referred to herein as a network cloud. This may be, for example purposes, a regional portion of the world-wide network, or may represent the entire world-wide network of connected telephone equipment. All conventional telephone calls routed to call-in centers 121 and 122 originate somewhere in network cloud 100.

In addition to conventional telephone calls, there may be IPNT calls originating from computer platforms represented here by platform 127, placed to the call centers through the Internet, an Intranet, or other data network, represented by cloud 125, over a link such as link 126 shown connecting to processor 223. It will be apparent to the skilled artisan that there are a number of alternative ways Internet and other data network access may be provided to stations at call centers. For descriptive purposes following descriptions will refer to cloud 125 as the Internet cloud, although it should be understood that this is exemplary, and there may be other data networks involved.

In this example an incoming conventional telephone call to be routed to a call center is represented by vector 107 into a Service Control Point (SCP) 101. In some embodiments of the invention calls may go directly to one of the call centers illustrated, but in most embodiments an SCP is accessed first, and network-level routing may be done, wherein incoming calls may be routed based on information available to the SCP.

SCP 101 typically comprises a telephony switch somewhat more local to the calling party than the switches at call centers 121 and 122 illustrated. SCP 101 is coupled in this example to an adjunct processor 103 associated with a call-distribution processor 104. Call distribution processor 104 has call statistics describing call distribution between call-in centers 121 and 122 (typically over a larger number of call-in centers than two).

An Intelligent Peripheral 102 is provided in this example coupled to SCP 101, and its function is to provide initial processing of incoming calls. This initial processing may be done by voice recognition, eliciting information from a caller such as type of product and model number, language preference for communication with an agent, and much more, depending on the nature of the service provided by the organization providing the call centers.

A processor 208 including an instance of telephony server T-S 207, also including an instance of a statistical server (Stat Server) 209 is coupled by two-way data link 214 to the other parts of the system at the initial call processing and routing system associated with SCP 101. It will be apparent to those with skill in the art that the functions of CD Processor 104, Adjunct Processor 103, IP 102, T-S 207 and Stat Server 209 may be accomplished in a variety of ways in hardware and software mix. There may be, for example, a single hardware computer coupled to central switch 101, and the various servers may be software implementations running on the one hardware system. There may be as well, more than one hardware system, or more than one CPU providing the various servers.

In this embodiment, as described above, conventional calls incoming to SCP 101 are routed to call centers 121 and 122 via PSTN lines 105 and 106. The convergence of lines 105 and 106 to SCP 101 and divergence to call centers 121 and 122 is simply to illustrate that there may be considerable switching activity between these points. Processor 208 connects to processor 223 and to processor 224 by digital data links 210 and 211. Again the convergence is just to illustrate the network nature of these links, which may connect to many SCPs and to many call centers as well. In a preferred embodiment the network protocol is TCP/IP, which is a collection of data protocols which are not discussed in detail here, as these protocols are in use and very well-known in the art. There are other protocols that might be used, new protocols may be developed to provide better and faster communication, and other methods may be used to speed up communication. For example, Urgent Dispatch Protocol (UDP) may be used in some instances, which, for example, allows data packets to bypass routing queues.

Although not explicitly shown in FIG. 1, processors at the SCP shown may have Internet access into cloud 125, so IPNT calls may be directed to computer equipment at the SCP, and, as will be described further below, processes at the SCP may apply to IPNT calls as well as to conventional calls.

Processor 208 running an instance of T-S 207 as described above may control routing of calls, both conventional and IPNT at the network level, that is, calls received at SCP 101, in the same manner that processor 223 may control routing at central switch 123. In the case of routing of IPNT calls by the processes of an intelligent network router, the inventors are not aware of such intelligent routing in the art for IPNT calls, and this functionality is considered by the inventors unique.

It is emphasized again that not all embodiments of the present invention require all of the elements and connectivity shown in FIG. 1, although some embodiments will use all of the elements and connectivity shown. Also, functionality in various embodiments of the invention described in enabling detail below will differ not in hardware and connectivity in all cases, but in application and execution of unique control routines in many cases.

Uniform Control of Mixed Platforms in Telephony (3208)

In a preferred embodiment of the present invention unique control routines are provided for execution on such as processor 223, processor 224 and processor 208, providing communication ability thereby between call centers such as centers 121 and 122, and between call centers and initial call processing centers such as that represented by SCP 101.

Figure 2A:
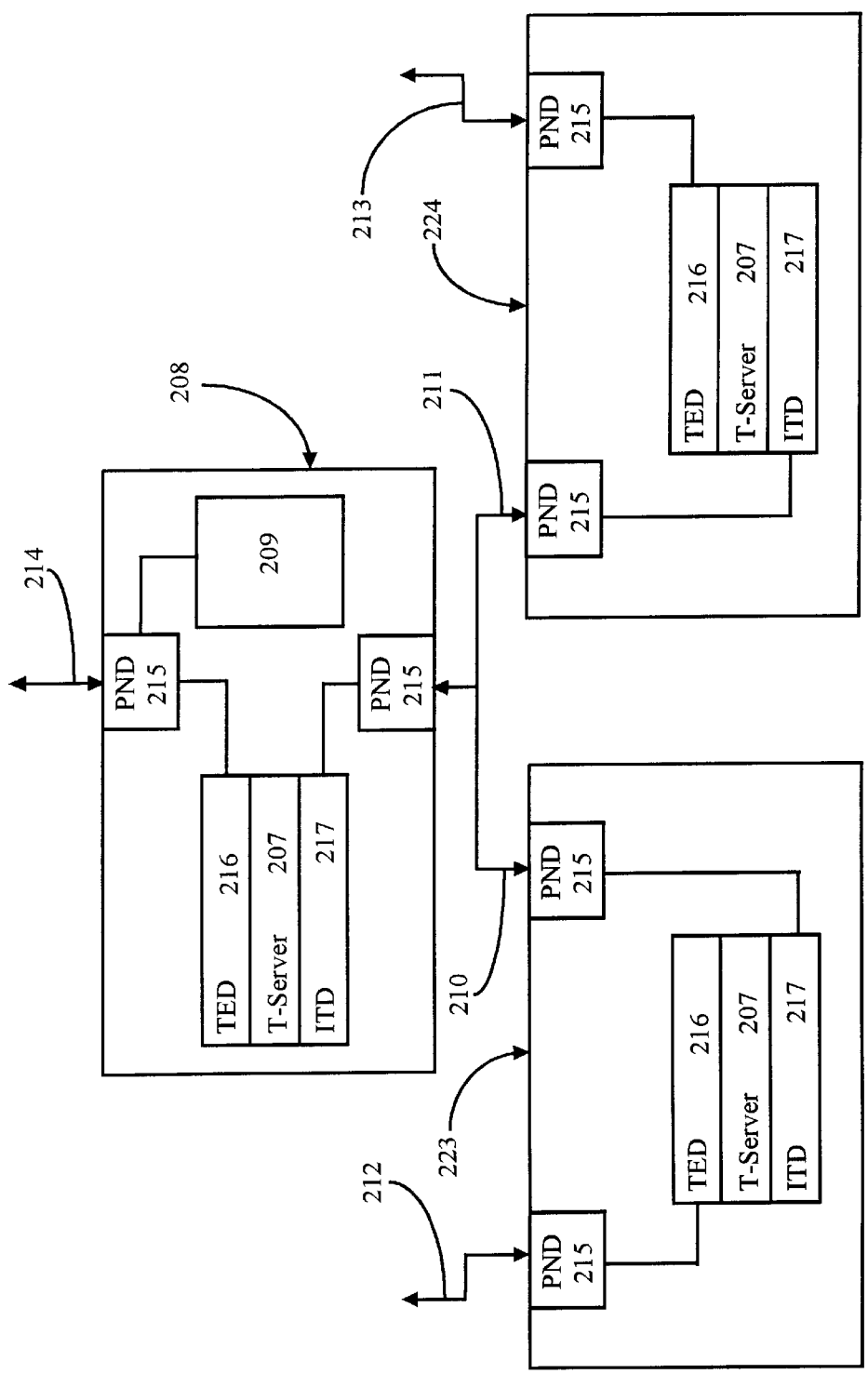
FIG. 2A is a block diagram representing communication functionality between equipment groups in embodiments of the present invention.

FIG. 2A is a block diagram representing a unique communication capability provided in a preferred embodiment of the present invention. There are, as described above in the Background section and known in the art, several different kinds and manufactures of call switching equipment. Each central switch uses a proprietary communication protocol for CTI applications. In CTI enhancement as known in the art, individual manufacturers provide processors connecting to their own switches and using the communication protocols proprietary to those switches. The computer enhancements, then, can serve a single manufacturer's switches, and provide communication between those switches. If a user, however, has multiple call center sites, for example, having equipment from different manufacturers, a difficult situation arises. If that user decides on a computer enhancement, depending on which manufacturer provides the enhancement, the equipment at the other site may quickly become obsolete. To communicate with the other site, it may be necessary to purchase all new equipment for the other site to be compatible with the computer-enhanced site.

Processors 223, 224, and 208 are shown in FIG. 2A connected by links 210 and 211 as in FIG. 1, with additional detail of both software and hardware illustrated in a particular exemplary embodiment. In each processor there is an instance of T-S 207 executable. To communicate with other devices each processor must have one or more ports configured to accomplish the communication. The implementation of such ports is represented in FIG. 2A by the representation PND 215. PND 215 in each instance is a physical network adapter for the network to which it is intended to connect, such as microwave, optical, coaxial, ring-network, and the like, as well as the software drivers required to control those adapters.

Layered to each instance of T-Server 207 in each processor is a control routine for handling data communication with either an instance of telephony equipment (switch 123 for example) or another T-server. Hence, in FIG. 2A, each instance of T-server 207 is layered with a Telephony Equipment Driver (TED) on one side, and an Inter T-Server Driver (ITD) on the other side. Connectivity of an ITD or a TED to a PND is based on the external connection intended at the PND. For example processor 223 is connected on one side to switch 123 by link 212, so TED 216 in the instance of processor 223 will be configured to drive communication with switch 223 (according to the make and manufacture of that switch). On the other side processor 223 is connected via link 210 to processors running other instances of T-server 207. Therefore ITD 217 connects to PND 215 at link 210.

Although not shown explicitly in FIG. 2A, which follows the architecture of FIG. 1, it will be apparent to those with skill that a processor may also be configured with an instance of TED on each side of a instance of T-Server 207, providing thereby a processor capable of interconnecting two central switches of different type, make, or manufacture directly. In this manner processors may be adapted to interconnect central switches of various manufacturers and processors running instances of T-Server 207, and, by providing the correct PNDs, the processors thus configured may be adapted to communicate over any known type of data network connection.

In the matter of Internet protocol telephony, in the general description provided above with reference to FIG. 1, it was described that Internet access may be made by processors at either call centers or SCPs in the conventional network, and that functions provided for conventional telephony may also be applied to IPNT calls. With regard to FIG. 2A, IPNT calls received at any processor associated with SCP 101 may be routed through processor 208 and via links 210 and 211 to processors 223 and 224, where such IPNT data may be provided to agent's stations at associated call centers. In this process, IP addresses may be altered and substituted, as a way of routing the IPNT data. For example, an IPNT call may be directed to processor 208 by one IP address, and the IPNT call may be found to be from a particular client of the organization to which the call centers are dedicated. A routing decision may be made at the SCP such as in processor 208 as to the call center best adapted to deal with the client, and the IP address for a processor at the call center may be substituted.

In this manner, according to embodiments of the present invention, a system is provided for the first time that allows radically different telephony systems to be joined in high-functionality integrated intelligent networks.

Escalatory Reactive Call Routing (3207)

Figure 2B:
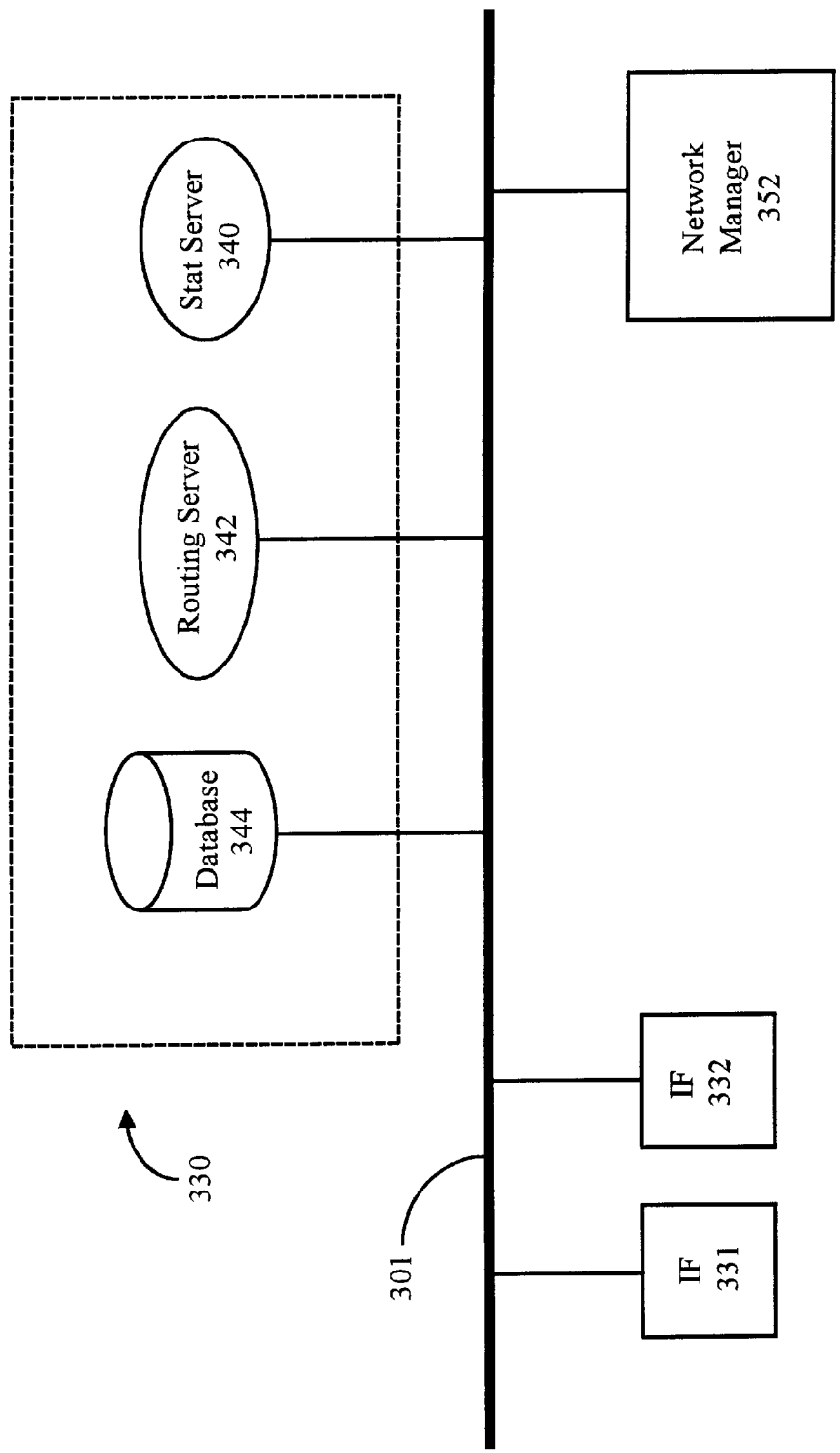
FIG. 2B is a block diagram illustrating a unique call center-level routing system in an embodiment of the present invention.

FIG. 2B is a block diagram depicting a unique escalatory reactive routing system 330 according to a preferred embodiment of the present invention, which may be implemented on a call center or at the network level, such as in call center 121 or such as in network cloud 100 of FIG. 1. In this routing system, as implemented at the call center level, processor 223 (FIG. 1) is notified when a call is received, and sends information about the call to a routing server 342. Routing server 342 is typically implemented as a part of T-server 207, which routes a call to an agent best qualified to answer the call based on predetermined criteria. The T-server having the routing server need not necessarily be implemented on processor 207 as shown in FIG. 1, but could be resident elsewhere in the networked system. Routing server 342 typically directs switch 123 to route the incoming call to the designated agent.

Database 344 in FIG. 2B is a customer database typically maintained on such as data file server 303 (FIG. 1). Routing server 342 comprises control routines which may be executed on processor 223 (FIG. 1) or there may be a separate processor on network 301 executing the router. A stat server 140 is adapted to track and provide statistical data concerning calls made, completed and the like, and to maintain data on agents skill profiles and agent's activities, and to generate reports. Again, stat server 140 may execute on processor 223, or on another processor connected to network 301. Finally, a network manager 352 is also connected on the network, and is adapted to the task of managing aspects of LAN 301.

Routing in this embodiment is typically based on (i) the skills set of the agent (ii) information relating to the calling party, (iii) activities of the call center, and (iiii) legal or other authorization held by an agent. Examples of the skills set of the agent are language, product knowledge, and the like. Examples of calling party information are products purchased, geographical location and the like. Examples of call center activities are number of available agents, calls previously handles by an agent, and the like.

At the same time an incoming call is directed to a particular agent, data retrieved from database 344 is directed on LAN 301 to the proximate video display unit (VDU) at the workstation assigned to that agent. The agent is then enabled to deal with the call in the best possible manner.

It is apparent to the present inventors that the expeditious functioning of routing system 330 is highly dependent on the expeditious functioning of the various elements of the overall system, including, but not limited to software and hardware elements. These elements include the functions of all of the elements shown in FIG. 1, specifically including all of the communication links, both telephony and digital. If for example, stat server 340 or database 344 experiences a sudden degradation in service, the routing server is going to be delayed as well. As another example, there may be an unexpectedly large number of accesses to database 344 in a short time, overloading a search engine associated with the database, and this circumstance could degrade overall performance in routing. As a further example a partial or total loss of a communication link, such as digital network link 210, will severely degrade overall system performance.

By virtue of network connection and interconnection, network manager 352 is enabled to track and monitor performance and function of all system elements, and to report to database 344 and to routing server 342, and the routing server also has access to other data and statistics via stat server 340 and database 344. Routing server 342 also has access in this embodiment to multiple routing algorithms which may be stored at any one of several places in the overall system. An object of the invention in the instant embodiment is to provide for executing different routing algorithms based on system performance as reported by network manager 352 and in accordance with data available from database 344, stat server 340, and received via digital network link 210 as described in further detail below. Database 340, routing server 342, and stat server 340 communicate through layered protocol as known in the art, including but not limited to layers for network-dependent protocol, Internet protocol (IP), User Datagram Protocol (UDP), Simple Network Management Protocol (SNMP), and manager process.

In a preferred embodiment, routing server 342 selects a routing algorithm to be executed based on degradation in performance of part of the call center or components, either hardware or software, in an escalatory manner. The more the system degrades, the more the router reverts to emergency measures. The selected algorithm preferably reduces or eliminates access to or use of the component or resource adduced to be degrading in performance.

It will be apparent to those with skill in the art that the invention described with reference to FIGS. 2A and 2B is not limited to monitoring only system and component faults. It has broader application. For example, algorithms may be stored for operating according to load level. Other algorithms may be selected according to specific times-of-day, and such algorithms may be selected based on the time window in a 24-hour period. As another example, algorithms may be stored and selectable based on days of the week. Still other algorithms might be prepared to be accessed with introduction of new products and the like. Statistics may be tracked relative to the percentage of agents free, for example, and a routing algorithm may be accessed for the situation wherein 90% of agents are busy, routing calls only to the next free agent rather than following a skill-based routing algorithm. The invention in this embodiment allows routing algorithms to be selected and executed based upon a very broad congruence of circumstances, so that a call center may be operated at best efficiency even as circumstances alter rapidly, including circumstances of hardware and software functionality, as described in specific embodiments above.

In other embodiments of the instant invention escalatory reactive call routing may be implemented at the network level, with a router implemented as a portion of T-S 207 running on processor 208. In this case stored routing algorithms may be selected and implemented in conjunction with functionality of network level components, both hardware and software, and in accordance with call loading into SCP 101.

In the matter of Internet protocal telephony, IPNT calls received anywhere in the system can be redirected (routed) by the intelligence provided and described relative to conventional telephony, and such calls, once received and redirected, may be conducted to final agent destinations either through the connectivity of the calls centers and the intelligent network, or redirected by new IP address back into the Internet (or Intranet) and thence to agents equipment by direct connection.

Agent Level Call Routing in Telephony Systems (3200)

Referring now back to FIG. 1, associated with SCP 101 in embodiments of the present invention, there is a processor 208 comprising an instance of a Stats-server 209 and an instance of T-Server 207, which processor communicates with other components via two-way data link 214. Communication in this embodiment is as illustrated in FIG. 2A and described in disclosure above relative to FIG. 2A.

In description above reference was made to TCP/IP communication on links 210 and 211, and that this protocol is merely exemplary. There are other protocols that might be used, new protocols may be developed to provide better and faster communication, and other methods may be used to speed up communication. For example, User Datagram Protocol (UDP) may be used in some instances, which, for example, allows data packets to bypass routing queues.

In conventional systems known to the present inventors, routing at the network level, that is, in the network cloud 100 associated with switching equipment receiving incoming calls and routing these calls to call centers, is typically done with reference to statistical history of call center activity, and routing to call centers is to queues at the call centers. In this conventional method, activity at each call center in a network is tracked and provided to service control points, and incoming calls are routed to the calls centers based on the latest available history. As an example of such a history algorithm, if there are two call centers in the system, and the latest statistical history indicates that call center 1 has received twice as many calls as call center 2, calls will be preferentially routed to call center 2 at a ratio to balance the activity. In this conventional system calls are routed from the network level to queues at the call center level. Once a call is received in a queue at a call center, the caller waits until his call is answered in order.

Referring now to FIG. 1, in a unique embodiment of the present invention, termed by the inventors Agent Level Routing, actual transactions at the call center level, rather than historical summaries, are reported from call centers to service control points, and calls are routed to agents rather than to queues or groups. Referring to call center 121 as an example, transactions of central switch 123 are monitored by T-Server 207 executing on processor 223, and shared on a continuing basis with T-Server 207 running on processor 208 associated with SCP 101. This activity data is stored and accessible with reference to stat server 209 on processor 208. Activity of central switch 124 at call center 122 is reported via link 211 also to T-Server 207 in cloud 100 (which represents one instance of possible multiple SCPs and T-Servers in the network. Each T-Server may serve more than one SCP). Actual activity at all call centers is reported to all SCPs in this manner.

In addition to this actual call center activity data, data relative to agent skills and the like is also provided and stored at the network level. For example, when an agent logs in at a call center, the availability of this agent is reported to the network level, and the stat-servers at the network level have agent profiles for reference in making routing decisions.

In the instant embodiment an incoming call 107 at SCP 101 is processed, for example, with the aid of IP 102. With information about the needs of the caller, T-S 207 makes reference to the stat-server data of actual agent status at call centers, which is continuously updated via digital network links 210 and 211, for example, from call centers, and to the available data on agent profiles and the like, which is updated as well, but at perhaps longer time increments. T-Server 207 makes a routing decision to an agent based on the best fit with the latest available data.

Once the routing decision has been made at the network level, the destination decision for the call is transferred by T-Server 207 running on processor 208, for example, at the network level, to T-Server 207 at the call center where the agent to which the call is to go is resident. For exemplary purposes assume the destination is an agent at call center 121 (FIG. 1), and the destination information is sent to T-S 207 running on processor 223.

The call is received on line 105 at the call center and matched with the destination data received by T-S 207 on link 210. T-S 207 on processor 223 now routes the call to the agent.

Call-center-level routing in embodiments of the present invention was described above, and may be done in the instant embodiment as well. For example, T-S 207 running on processor 223 has received a call on line 105 and matched that call with data received on link 210, which data includes an agent destination for the call based on the best fit available to T-S 207 running on processor 208 at the network level. In the time since the original routing occurred and the call and data have been received at call center 105, the situation may have changed. The agent to which the call was routed may have, for example, logged off, and is no longer available. T-S 207 at processor 223, executing a routing algorithm, may now reroute the call to the agent who is a next best fit and available at call center 121.

As a further example of agent level call routing, consider a call received at SCP 101 from a customer who speaks Spanish, and indicates a preference for a Spanish-speaking agent. In FIG. 1 the pool of Spanish-speaking agents is represented by inclusion area 241, encompassing workstations 132 at call-in center 121 and workstation 134 at call-in center 122. An agent profile provided to stat-server 209 at the network level for each of these agents indicates the Spanish skill. The continuously updated transaction information from call centers 121 and 122 indicates the agent at telephone 138 is available, while the agent at telephone 142 is not available. Given this information, the call will be routed to call center 121 on line 105, and the data as to agent destination will be sent to T-S 207 at call center 121 via digital link 210.

In summary, in the instant embodiment, agent level routing is accomplished by providing actual call center agent status on a continuing basis to Service Control Points along with agent skill profiles and the like. Incoming calls are then routed to agents, rather than to queues at call centers. At the call center to which a call is routed with destination data for an agent, a further opportunity for routing allows such calls to be rerouted at the call center level.

In the matter of IPNT calls which may be directed first to a processor associated with a SCP in an intelligent network, given the origin of the call, just as is available form an ANI field, for example, in a conventional telephony call, decisions may be made as to agent level routing in a manner similar to the decisions made for conventional calls. It is only the mechanism for directing the IPNT calls that differs.

Moreover, IPNT calls directed to a processor associated with a SCP may be processed by an IP in an automatic manner, even including voice response, eliciting further information from the caller, which may then be factored into the routing of the calls.

It should also be understood that reception of and routing of IPNT calls need not be done at the same equipment and using the same software as is used for conventional telephony. Entirely separate centers may well be provided in various embodiments of the invention for handling IPNT calls. Internet servers may be provided for example, wherein adjunct processors, IP functionality, and the like is provided for IPNT in a manner parallel to that described herein for conventional telephony. In the matter of call center operation and management the idea of a dumb IP network may be just that. Intelligence is needed and preferred for managing large call volume to a wide range of possible destinations for best customer service.

Parallel Data Transfer and Synchronization (3201)

In another aspect of the present invention enhanced functionality is provided in routing and processing telephone calls from Service Control Points (SCPs) and other origination points at the network level or at other call centers established for servicing callers seeking service. This enhanced functionality enables agents at such call-in centers to have immediate access to information derived both from callers and from stored data. In descriptions below of the instant embodiment, assumption of SCP 101 in the network cloud and call center121 is made for principle purposes of illustration.

In descriptions above, referring now to FIG. 1, an intelligent peripheral (IP) 102 was described, serving to aid in initial processing of calls from persons seeking services from an organization providing such services from one or more call-in centers. In the above descriptions also, such callers were referred to as customers, following a continuing example utilizing an organizational structure having a technical service call-in operation for such as a computer equipment manufacturer.

Following the example of persons calling in to seek technical services in installing and/or configuring computer-related products, when such a caller first connects (FIG. 1, vector 107, SCP 101), initial processing will typically include eliciting information from the caller relative to such as caller preferences and relationship of the caller to the service provider's customer database. For example, the caller may have just purchased a model of one of the provider's products, meant to be installed in or connected to a particular make and model computer, and is experiencing difficulty in installing the product and making it function properly with the computer. In another instance such a caller may have had the provider's product for some time, and is only recently experiencing difficulty.

Most manufacturers provide a service whereby a customer may register a product, and in the process of registration a range of information from the customer is solicited, which will typically include the exact nature of the product in question, including model number, and also the characteristics of the computer (in this example) to which the customer has installed or is attempting to install the product. If a customer has registered his/her purchase, that information will typically be recorded in the customer database, which, referring to FIG. 1, may be stored on Data File Server 303 connected to LAN 301, to which processor 223 running an instance of T-S 207 is also connected. In other instances there may be other information stored in the customer database. For example, in the case of an insurance company, the customer's name and address, policy number, and the like will be in the database.

If there is information about a call in a customer database at a call center, it will be advantageous to both the customer and the service provider to access that information and provide same to the agent who handles the customer's call. Such information cannot be retrieved, however, until and unless some correlation is made between the incoming call and the database.

In the instant embodiment of the invention, which is exemplary only, initial processing is used incorporating IP 102 to elicit information from a customer. This may be done preferably by recorded query and voice recognition. In such a system a call is answered, and a menu system is used to categorize the caller and to elicit and record sufficient information to enable routing (as described above) and hopefully to correlate a customer with an existing database.. By recording is meant enrolling the nature of the responses in some form, not necessarily by voice recording. For example, a typical initial processing transaction involves a recorded query to the caller such as "Do you prefer Spanish or English". In some locales the query might be phrased in a language other than English. The caller is requested to respond typically by selecting a key on the touch-tone pad of his/her telephone. In many instances now as well, voice recognition is built into the initial processing machine intelligence, and the customer is instructed in verbal response, such as: "Say Yes or No". The IP in this case recognizes the response and codes data accordingly.

Information derived from a caller in such initial processing in conventional systems, as has been described herein above, is coded and sent with the routed call, to be dealt with at the call center to which the call is routed after the call is received. In instant embodiments of the present invention, such data, and in some cases other data, is routed to a call center in parallel with the routed call, over a digital network link, allowing the data to precede the call in most cases. The data is re-associated with the call at the call center in a unique fashion described below. This parallel data transfer also makes the transfer switch-independent.

Referring again to FIG. 1, an instance of T-Server 207 is running on processor 223 connected to central switch 123 of call center 121. Processor 223 is connected to digital data link 210, and switch 123 is connected to the PSTN line 105. In the exemplary embodiment there is an instance of T-Server 207 also running on processor 208 associated with SCP 101. In the instant embodiment T-S 207 at processor 208 requests a semaphore from T-S 207 at processor 223 at the call center level. The semaphore is a virtual routing point in the call center, that is associated with the destination of the call, but is not the same as the destination of the call. Also, the semaphore is freed as soon as the call is completed. Once the semaphore is returned, the routed call is forwarded to switch 123 in this example over line 105 to the destination associated with the semaphore. Data associated with the call, which may be data elicited from a caller with the aid of IP 102, is not coded and sent with the call, however, as in the prior art, but rather transferred to T-S 207 at processor 223 over digital network line 210.

As digital network link 210 is generally a faster link than telephone line 105, the data associated with a forwarded call will typically arrive before the call. This is not, however, a requirement of the invention. The data sent over link 210 to T-Server 207 on processor 223 includes not only data associated with the call, but the semaphore as described above. The call received on line 105 is not transferred directly to a final destination but to a semaphore routing point. When the call and the data are available, the call center T-Server 207 associates the call with the data by the knowledge of the semaphore to which the call has been associated. From the semaphore routing point the call is routed on to the final destination.

The semaphore can be accomplished in a number of ways. For example, the call can be directed to a virtual number and the data may have the virtual number in one field of the data protocol. The semaphore could also be an agent's extension number, but the call is still routed to a semaphore control point to be associated with the data before being routed on to the agent. Those with skill in the art will recognize that the semaphore association may be made in other ways as well.

The data typically in this embodiment is sent via network 301 to a VDU of the network interface at the operator's workstation to which the call is finally routed. This may be, for example, IF 331 or 332 in FIG. 1. Moreover, data associated with the call and transferred to T-S 207 at the call center may be used to associate the caller with the customer database in Data File Server 303, and to retrieve further data which may also be forwarded to the VDU at the agent's workstation. As described above, it will most usually be the case that the data will arrive before the call, and correlation with a customer database may therefore be done before the call arrives.

The re-association (synchronization) of the call and the data at a rerouting point also affords an opportunity for further re-routing. There will be, as described above in the section on agent-based routing, some calls wherein the agent to which a call is originally has become unavailable in the time wherein a call is transferred. In this case T-Server 207 may re-route the call from the semaphore point to another agent, and send the data to the new destination.

It is not strictly necessary in the instant embodiment that the data be transferred by another instance of T-Server as described in the preferred embodiment immediately above. The call forwarded and the data transferred may in fact be sent by an originating entity such as another call center (i.e. PBX), an SCP or IP (network IVR), or some other IVR which may or may not be in the network.

In the matter of IPNT calls received at processors associated with SCPs, whether the SCPs are adapted to handle both conventional and IPNT calls, or just IPNT, data elicited from the caller may be prepared and provided by a separate link to a call center, and re-associated with the IP call redirected to an agent at the call center, or to a lower-level routing point at the call center, where both the call and the data may be rerouted. In this fashion all of the advantages of the invention described for conventional telephony may also be provided for IPNT.

Statistically-Predictive and Agent-Predictive Call Routing (3202)

In still another embodiment of the present invention predictive routing is incorporated into machine intelligence to expedite routing in a most cost-effective manner. Predictive routing according to embodiments of the present invention is based on knowledge of latency experienced in equipment while implementing certain operations, together with reasonable, but non-obvious assumptions that may be made to expedite operations. It is in implementing the assumptions that the inventions lie in the instant aspects and embodiments of the invention.

Referring again to FIG. 1, in the general case T-Server 207 running on processor 208 does call routing for calls incoming at SCP 101. This routing is done with the aid of data stored at stat-server 209, which may be data obtained from call centers on some regular basis.

In the instant embodiment related to group-predictive routing, incoming calls are routed to groups at call centers (call center 121 for example). In routing calls to groups, the goal is to route an incoming call to the group which has the lowest projected handling time for the call. The algorithm, for example, for handling time may be the present number of calls in the group queue times the historical average call length.

In this embodiment the projected handling time is extrapolated on past history and the last action which occurred, and is re-computed each time feedback from the group is received. The predictive nature is derived from the fact that each time a call is routed, an assumption is made that the new call is added to the queue at the group to which it routed, without waiting for the call center to return the information, which involves latency. For example, when a call is received at SCP 101 (FIG. 1), there is a finite time involved before a routing decision may be made. Once the call is routed, there is a delay (latency) before the call is received at the call center and added to the group queue (in this example). There is a further delay for T-Server 207 to be cognizant of the arrival of the call. Then there is a delay until the time that T-Server 207 at processor 207 sends updated group queue data to T-Server 207 at processor 208, which updates the historical data at stat-server 209.

The overall latency and delay until historical data may be updated at the network level may vary, but an exemplary assumption may be made for purposes of illustration. Assume the overall delay between actual updates is twenty seconds. If calls are being received at the SCP at the rate of ten calls per second, two hundred calls will be received to be routed in the time between updates of historical information upon which routing decisions are made. In the group-predictive embodiment described, each time a call is routed at the network level, an assumption is made that the call is actually received at the call enter group queue, and the data (stat server 209) is recalculated based on that assumption. The next call received is then immediately routed based on the recalculated data based on the assumption. The update that eventually arrives is used to readjust the database to reality, and call routing continues between updates based on the assumptions made.

In the case of routing calls to logical destinations wherein further routing is done at the call center level, as described above for agent-based call routing, wherein agent status is reported to the network level, predictive routing according to an embodiment of the present invention may be done similarly to the predictive group routing described above. In the agent routing case incoming calls are immediately routed with an assumption that the agent to which the call is routed is then busy, and the status is corrected when actual agent state is returned.

Figure 3:
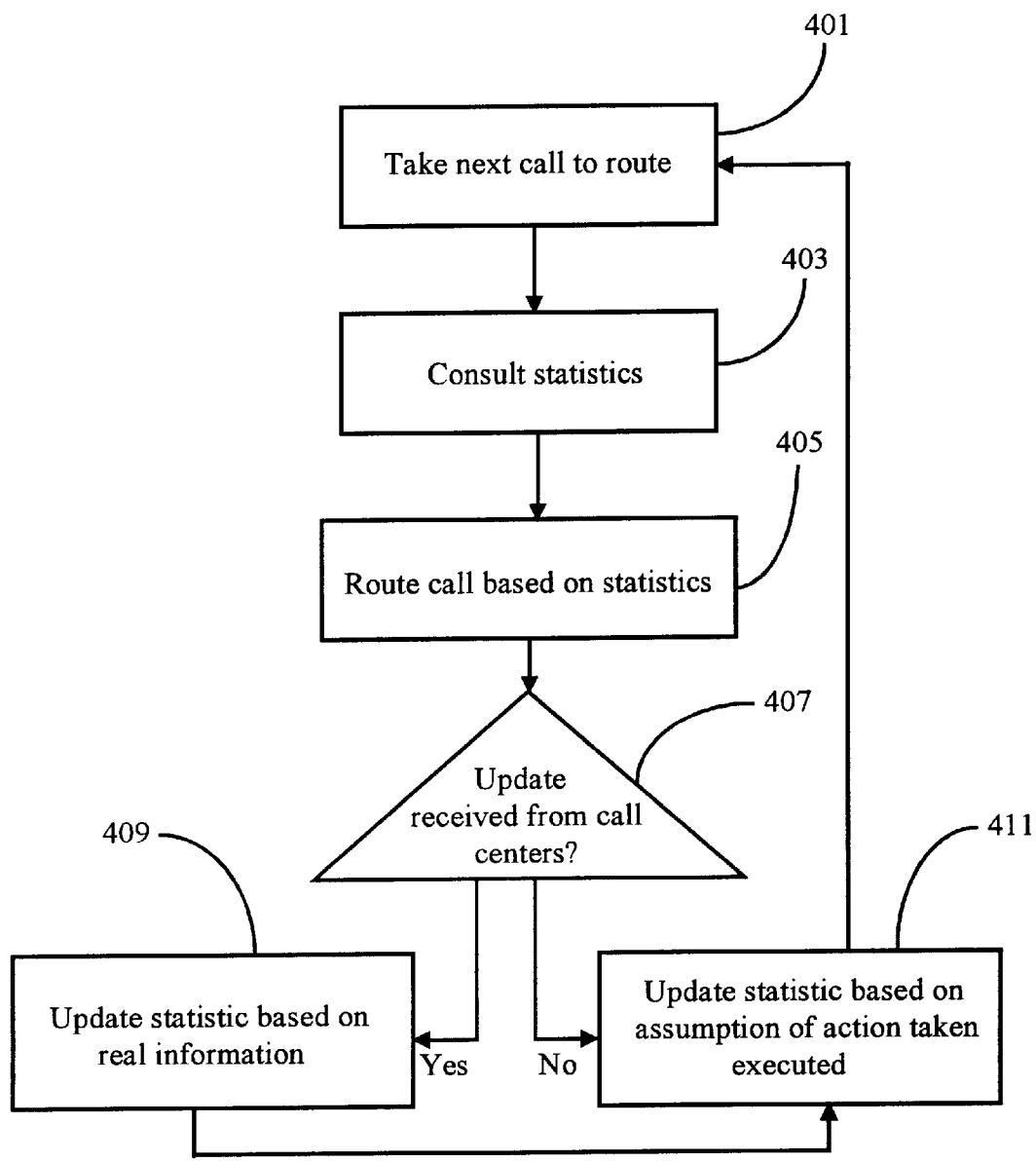
FIG. 3 is a process flow diagram depicting steps in a process according to a preferred embodiment of the present invention.

FIG. 3 is a process flow diagram depicting the decision and action flow for a predictive routing process according to the instant embodiment of the invention. At step 401 action is precipitated on a next call to be routed. Action is typically controlled in this embodiment by an instance of T-Server 207 running on a processor at the network level. At step 403 current statistics are consulted, which, in the case of group level routing comprises an indication of projected handling time for each group in the decision set to which calls may be routed.

At step 405 the call is routed based on the statistics available. At step 407 it is determined whether or not a real update to the statistics has been received. If Yes, at step 409 the statistical data is updated to reflect the real information, correcting all assumptions since the last real update, if any correction is necessary. Then control passes to step 411, where statistics are updated based on the routed call as well.

If a real update is not yet received, at step 411 the statistical data is updated based on an assumption that the call just routed was completed, and the call is added to the statistics, which are recalculated based on the assumption. Then a next call is taken to be routed at step 401.

In the case of agent level routing the process flow is much the same as that shown in FIG. 3, except calls are routed at step 405 based on agent status, and updates are based on agent status. That is, when a call is routed, the assumption is that the agent is then busy. Agent status is updated to real data as real data is reported back to network level from call centers. If no real data comes back, an assumption based on statistical call length is used to 'best-guess' re-availability of that agent.

Group level predictive call routing may be done for conventional call centers that are capable of reporting only historical data to the network level. Predictive call routing based on agent status is only possible in the unique case wherein actual status of call center switches may be reported to network level.

It will be apparent to those with skill in the art that predictive call routing may be applied to directing and redirecting of IPNT calls as well as to routing conventional telephony calls as described above. The differences are only in the details of the connectivity and data protocols, all of which is well-known in the art. The inventive subject matter in predictive routing is in the decisions made based on predictive assumptions, not in the nature of the call or the organization of data packets and the like.

Dynamic Re-Routing (3203)

In yet another aspect of the present invention, dual routing is performed. Reference is made again to FIG. 1, wherein a network level system shown in cloud 100 is enabled to perform original routing by virtue of an instance of T-Server 207 running on processor 208. In the instant embodiment routing is done at the network level by any of the methods discussed above. That is to group level, agent level, logical application, and so on. Original routing, however, is not done to the actual destination. Rather calls are routed to a call-center-level routing point, and data is sent to the call center via the digital data link, such as link 210 to processor 223 running an instance of T-Server 207 and connected to switch 123. The data sent comprises an indication or instruction of how the call should be treated.

Whenever a call is routed to a call center, it is never certain that by the time the actual call arrives, the destination will still be available, or the best fit for the call. There are many reasons for this. For example, because of latency in transmission and so forth, other calls may be routed to the same destination in the interim. Also, in many systems switches at the call center level are also accepting local calls as well as calls routed from the network level. In other instances some equipment malfunction of fault may misroute one or more calls. The uncertainty of availability when the call arrives is the reason for the instant embodiment of the invention.

At the call center routing point the call is synchronized with whatever data is sent, and a second routing request is generated. This second request is referred to by the inventors as "double-dipping". The second routing request is made to a local router running typically as a function of the instance of T-Server 207 executing on such as processor 223 (FIG. 1).

Because the local router is closer to the requested destination, and because it arbitrates all incoming calls, it can confirm the original routing assuming the original destination is still free, or it can re-route the call if the destination is no longer available, or queue the call, etc.

Figure 4:
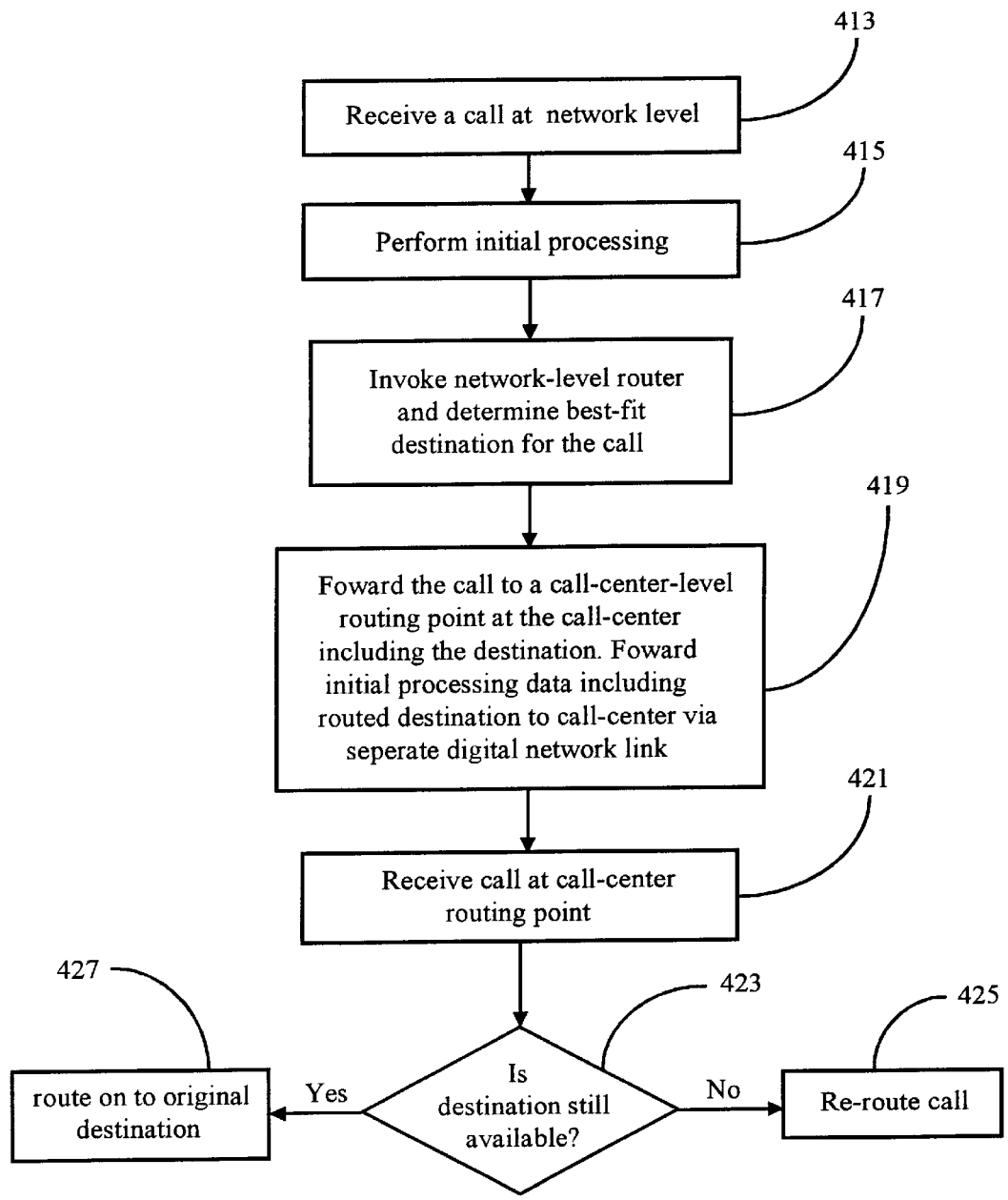
FIG. 4 is another process flow diagram depicting steps in a process according to another preferred embodiment of the present invention.

FIG. 4 is a process flow diagram depicting a process flow in the "double-dip" embodiment of the present invention described herein. At step 413 a call is received at the network level. At step 415 initial processing is accomplished, which may include eliciting information from the caller. At step 417 the network-level router is called, and a best fit destination is determined for the call based on the information available at the network level.

At step 419 the call is forwarded, but not to the best-fit destination determined. The call is forwarded rather to a routing point at the call center local to the best-fit destination. Data associated with the call, including the best-fit destination determined in step 417 is forwarded to the call center via a digital data link such as link 210 in FIG. 1. At step 421 the call is received at the call center routing point.

At step 423 it is determined whether the originally routed destination is still the best destination according to information at the call center level. If so the call is forwarded to the original destination at step 427. If not, the call is re-routed based on local information by the local router.

It will be apparent to the skilled artisan that dynamic rerouting, like other aspects of the present invention, may apply to IPNT calls as well as to conventional telephony as described above. IPNT calls may be directed to selected destinations, synchronized with data perhaps provided by a different route, and the redirected, even several times if necessary.

External Positivistic Forward Transfer in Call routing Systems (3204)

In yet another embodiment of the present invention calls are routed to call centers and data passed in a switch-independent manner, similar to that described above in the section entitled *Parallel Data Transfer and Synchronization*. In the previous description, however, the instance of T-Server running at the network level requests a semaphore from the call center. When the semaphore is returned, the call is routed and data is transferred on the digital network link, the data including the semaphore, which allows the data to be synchronized with the call at the semaphore point at the call center level.

In the instant embodiment, time to route and transfer is improved by having the instance of T-Server running at the network level (on processor 208 in FIG. 1, for example) co-opt a semaphore, based on the best available information then at the network level. This presumption by the router in the T-Server at the network level eliminates the time required for negotiation with the T-Server at the call center. The semaphore assumed by the network level T-Server is freed later when CTI information is returned that the call was correctly processed.

As in the previous description, when the routed call arrives at the call center semaphore point, the data, by virtue of having an indication of the semaphore included, is synchronized with the call and the call is forwarded to the destination. Data may be provided to a VDU at the agent's workstation at the destination via LAN connection as shown in FIG. 1.

Figure 5:
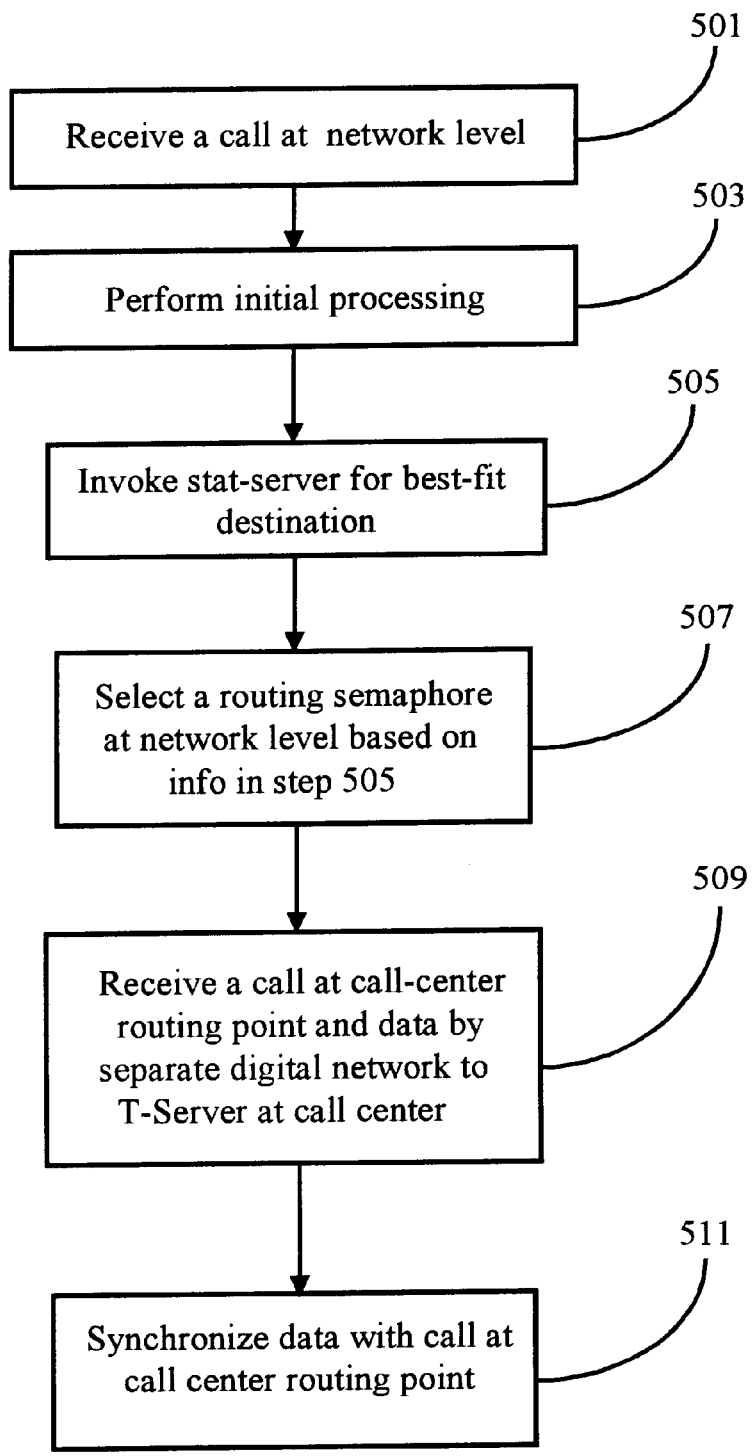
FIG. 5 is yet another process flow diagram depicting steps in yet another preferred embodiment of the present invention.

FIG. 5 is a process flow diagram indicating steps in practicing this embodiment of the invention. At step 501 a call is received. At step 503 initial processing is performed. At step 505 the router at the network level consults a stat-server (see element 209, FIG. 1) for a best-fit destination. At step 507 the router selects a semaphore destination based on the information in step 507. At step 509 the call is routed to the call center semaphore point and associated call data is routed via a separate data link (see link 210, FIG. 1) to the call center. At step 511 the data and the call are synchronized at the routing point. Further step are as indicated above in the section titled *Parallel Data Transfer and Synchronization*.

It will be apparent to the skilled artisan as well that positivistic forward transfer may apply to intelligent routing of IPNT calls, just as it applies to conventional telephony calls as described in this section.

Agent-Initiated Dynamic Requeuing (3206)

In yet another aspect of the present invention a method is provided for rerouting calls from agent level, wherein the agent discovers, having received a call and interacted with the caller, that the call was misrouted, or needs attention by another qualified agent. By misrouted in this context is meant that for whatever reason the agent that received the call is unable to provide the service the caller wants or needs. The call may have been physically misrouted due to some error in hardware or software, so it is handled by a different agent than to whom it was originally routed, or, the call may have gone to the right agent, but the caller gave the wrong information, or insufficient information, for the system to get the call to an agent able and ready to provide the needed service, or, during the call, need arises for an agent with specific skills or knowledge.

In this embodiment a first agent has received the call and has discerned from the caller that another agent is required to handle the call. Potentially the agent also has a VDU with the caller's data displayed and input apparatus (keyboard, pointer) with which to communicate with the local T-Server.

In the conventional case the agent would be limited in options. The agent would transfer to or conference a physical phone number on the local or a remote central switch. The Automatic Call Distributor (ACD) on that switch would requeue the call. If the ACD were configured as a network ACD the call could potentially be distributed to other sites, but network ACD products typically work only between switches of the same manufacture. Also, the caller may have to wait again the full queue time.

In the instant embodiment of the present invention, by virtue of the presence and interconnectivity of the local instance of T-Server running on a processor (223, FIG. 1) connected to the local switch (123, FIG. 1), also connected to the agent's equipment by LAN 301, and using unique control routines provided in T-Server 207, the agent hands the call back to a local or a network routing point, potentially with added data elicited from the caller to better aid in further routing.

This operation is essentially agent-initiated double-dipping ala the description above in the section entitled Dynamic Rerouting. At the rerouting point rerouting of the call is requested of the local instance of T-Server 207, and the call is redistributed. The agent does not know who is available where for this transfer, and ACD is not involved. The agent, however, in this embodiment of the invention may have a choice of selecting a cold, warm, or conference transfer, which the agent may do by any convenient input which has been programmed into the control routines in the preferred embodiment.

In a cold transfer, the agent simply sends the call back to the rerouting point with whatever new data can be added, and the call is then transferred to a new agent directly without any participation by the first agent. In a warm transfer, the first agent is connected to the next agent to whom the call is re-routed before the caller is connected, allowing the first agent to confer with the next agent before the caller. In a conferenced transfer the first agent and the caller are connected to the next agent at the same time.

It will be apparent to the skilled artisan that agent-initiated rerouting may apply to intelligent routing of IPNT calls, just as it applies to conventional telephony as described herein. For example, an agent may ultimately receive an IPNT call at his/her PC/VDU, either with or without a screen pop of data pertaining to the client placing the call and/or to scripting for the agent to follow in handling the call. It may become apparent to the agent that the call has been mis-routed, or would, for whatever reaason, be better handled by another agent. By virtue of adaptive software executing at the agent's station or at a connected processor, or both, such a call may be handed back to a routing point with whatever additional data the agent may have ascertained, and then be rerouted to a (hopefully) better destination based on the original and/or new data.

Number Pool Data and Call Synchronization

In yet another aspect of the present invention, a unique routing method is provided for rerouting calls between call centers while minimizing the number of destination numbers required for the purpose. It is well-known in the art that the overall cost of operating a call center is strongly influenced by the number of destination numbers that have to be maintained to provide for peak traffic. In this aspect of the invention two or more call centers are assigned unique number pools of destination numbers that are used by a router in a sequential order to reroute calls between call centers.

Figure 6:
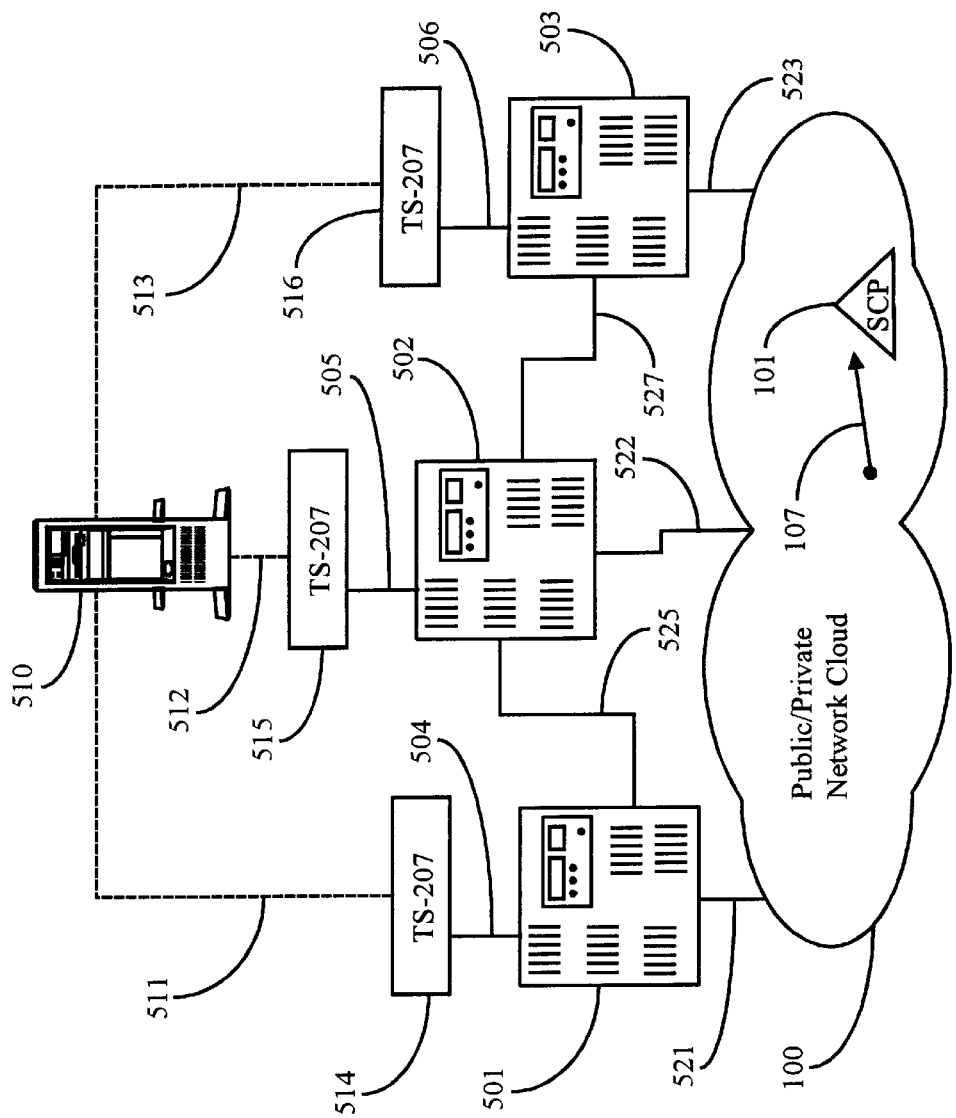
FIG. 6 is a system diagram of a call-rerouting system according to an embodiment of the present invention.

Referring now to FIG. 6, three call centers 501, 502, and 503 are illustrated having each an incoming telephone line over which calls out of network cloud 100 are originally routed. Line 521 carries calls to call center 501, line 522 to call center 502, and line 523 to call center 503. A service control point (SCP) 101 is shown in network cloud 101 with a vector 107 representing incoming calls that are initially processed, then routed to one of the three call centers.

It will be apparent to those with skill in the art that there may be more than one SCP sending calls to each call center, as there may be multiple 800 numbers used, the network may take any of several forms, and there may be more than the three call centers shown. The simplified representation of FIG. 6 is for purpose of illustration. There may also be other equipment in the SCP and a variety of protocols utilized in call processing and original routing.

It is unfortunate but true that not all calls routed to a call center are correctly routed, and may be handed over to agents at the call center where originally routed. A certain percentage of calls will be discovered to have been incorrectly routed, and to require rerouting to another call center. There may be any number of reasons for incorrect routing, and the reasons are not pertinent to the present aspect of the invention. What is important in this regard is that some calls will have to be rerouted.

In a conventional system, calls originally routed are sent to a destination number at a call center by a semaphore system, as has been described above, and sufficient destination numbers must be assigned and maintained at each call center to account for peak traffic. At the call center, calls are typically rerouted to agents at extensions at the call center, based on origination information and preprocessing information elicited at the SCP. The process of matching calls arriving at a call center with call data, and further routing calls to agents, and then clearing the semaphore so the destination number is free to be used again typically takes about twenty seconds.

The time of twenty seconds to handle an incoming call strongly influences the number of destination numbers that must be maintained. For example, if twenty incoming original calls per second are to be handled, a call center will need 400 destination numbers to allow twenty seconds to handle each call.

I like manner, in a conventional system, calls that have to be rerouted will each take the twenty second processing time, and additional destination numbers will have to be maintained for the rerouting traffic.

In the embodiment of the present invention illustrated by FIG. 6 a main re-router 510 is provided connected by a digital network link 511 to call center 501, by digital network link 512 to call center 502, and by digital network link 513 to call center 503. In practice, actual routing is accomplished, as known in the art, by control routines executed on a computer platform, known typically in telecommunications art as a processor. In the description herein the term router is meant to encompass all of hardware/software characteristic of routing, thus reference is made to router 510.

In this embodiment the connection from router 510 to each of the call centers is through dedicated processors (514, 515, and 516 respectively) further connected to the respective call centers by CTI links 504, 505, and 506, and each running an instance of T-server 207 described previously. This is a preferred embodiment, but in some embodiments the connection may be directly to the switch at the call center, assuming that the call center switch is adapted to execute the necessary control routines in conjunction with router 510 as described more fully below. Further, in this embodiment call centers 501, 502, and 503 are interconnected by telephone lines 525 and 527. These lines are preferred, but not strictly required in practicing the invention, as calls may also be rerouted between call centers back through network cloud 100.

It will be apparent to one with skill in the art that there may be many more than three call centers such as 501 connected to the network. In this instant embodiment there are only three call centers shown, however, this number is deemed sufficient for the purposes of illustrating an embodiment of the present invention.

In conventional network routing systems, as described above, destination numbers are assigned to a typical call center, and it to these destination numbers that incoming calls are routed. These destination numbers are phone numbers paid for by the company that operates the particular network. A typical call center may have many hundreds of destination numbers assigned to it. In a typical embodiment, each destination number costs about one dollar per month to maintain. In the case of a large network there may be many call centers, each having many hundreds of destination numbers that are generating costs to the company.

In the present embodiment of the invention unique number pool assignments are made to each call center interconnected by router 510, and used sequentially for rerouting of calls between call centers.

In the instant embodiment incoming calls are routed to various call centers, such as call center 501, via Telephony lines 521, 522, and 523, as described above. The call center destination to which a call will be sent is based on information obtained from the caller at SCP 101. Call center 501 having received a call, then sends a Call Arrival Message (CAM) to main router 510. Main router 510 uses the information provided in the CAM to make a routing decision. Main router 510 may also, in some embodiments, request additional information by sending a Route Request Message. A RRM would typically access additional information related to the caller that may be stored on a database or file server somewhere on the network. After a RRM is received, a Route Request Response (RRR) is sent back to main router 510. If main router 5 1 0 determines that the call has been routed properly, then the call is forwarded on to it's final destination such as an agents extension, etc. In this case conventional destination numbers would apply, and a semaphore would be sent back to the origination point when that particular call has been forwarded freeing it's destination number for the next call. This process takes approximately 20 seconds over conventional network lines.

However, if it is determined that a more appropriate call center such as call center 503 would best handle the call that arrived at call center 501, the call is rerouted to call center 503. Router 510 maintains a data set (pool) of unique destination numbers assigned to each connected call center for the purpose of handling the rerouted traffic. These are not the same destination numbers used by origination points in the network for sending original calls to call centers. It is not required that there be any sequential association in the actual destination numbers. What is required and maintained by router 510 is that the destination numbers at each call center be identified in a sequential order. For example, there is a first number for center 501 a second number for center 501, and so on, up to a last number for center 501. The same is true for numbers assigned in a unique pool to call center 502 and call center 503.

Consider as a very simple example that the unique pool of rerouting destination numbers for call center 502 has three numbers designated for our purpose as A, B, and C. A call arrived at call center 501, and it is determined that the call must be rerouted to call center 502. This call is sent to destination number A. A second call arrives at call center 501 for which it determined that rerouting to call center 502 is proper. This call will be sent to destination number B at call center 502. Similarly a call then arrives at call center 503 for which it is determined that rerouting to center 502 is needed. This call is rerouted to destination number C at call center 502. Now, the next call at either call center 501 or 503 for which rerouting to call center 502 is needed is sent to destination number A at center 502.

As operation continues, calls rerouted to call center A are sent sequentially to the identified numbers in the unique number pool associated with call center 502, always returning to the first after the last is used, then proceeding again through the pattern. At the same time, calls arriving at either center 501 or 502, to be rerouted to call center 503, are sent sequentially to identified numbers at center 503, and calls rerouted from 503 and 502 to 501 are sent sequentially to identified unique numbers at 501.

As previously described, there may be many more than the three call centers shown, and there may be many more than three destination numbers assigned to each call center in the unique rerouting destination number pool. The sequencing may be quite complex, but, at each call center, the unique numbers are used in a sequential pattern so that after one number is used, it is not reused again until all of the other numbers assigned to that call center for the purpose of rerouting are used once more.

There is another difference between the rerouting and the original routing. That is that the origination and the final destination of a call are both known in the rerouting, and a rerouted call sent to one of the numbers in the unique rerouting pool may be therefor almost immediately handed off to an agent, or to a queue for an agent. The processing time is about one second. The quantity of destination numbers necessary for each call center in the unique pool is thus one number greater than the number of calls that can be routed by main router 510 in one second. Typically router 510 will be sized based on empirical data and statistics. If, in a hypothetical situation router 510 is capable of rerouting 100 calls per second, then the quantity of destination numbers for each call center is theoretically 101, to be sure that each number used has a full second to clear before it is used again. In practice, a margin for safety may be employed by providing a quantity of destination numbers equaling, for example, 1.5 times the number of calls that can be routed in one second.

In FIG. 6 and the accompanying descriptions above relative to FIG. 6, a single router was described, referred to as router 510. In alternative embodiments of the present invention there may be more than a single router instance. There could, for example, be a router operable at each of the switches 501, 502, and 503 shown operating either on processors 514, 515, and 516, or, if the switches permit, on the switches. In another alternative router 510 could be connected to other routers in other locations not shown, and these further routers may be connected to other switches at other call centers, and so on. In these alternative embodiments, incorporating multiple routers, individual routers may negotiate with other connected routers, delivering messages, unique destination numbers for routing, unique call ID, any data attached to the original call or retrieved based on data attached to the original call, so the other routers may perform continued or additional routing.

THE SPIRIT AND SCOPE OF THE INVENTION

It will be apparent to those with skill in the art that there are many alterations that may be made in the embodiments of the invention herein described without departing from the spirit and scope of the invention. Many individual hardware elements in the invention as described in embodiments above are well-known processors and data links. The connectivity, however, of many of these elements is unique to embodiments of the present invention. Moreover, many of the functional units of the system in embodiments of the invention may be implemented as code routines in more-or-less conventional computerized telephony equipment and computer servers. It is well-known that programmers are highly individualistic, and may implement similar functionality by considerably different routines, so there will be a broad variety of ways in code that unique elements of the invention may be implemented. Also, the invention may be applied to widely varying hardware and software systems, and to both conventional telephony calls, or to Internet protocol calls, or to calls made by data mechanisms in any data environment, be it Internet, Intranet, or other. Further, the links between processors running T-Servers at the call center level and processors running T-Servers at the network level may be done in a variety of ways as well. to the associated equipment may be done in a number of ways, and there is a broad variety of equipment that might be adapted to provide the servers 223 and 224, and other such servers associated with call centers. There are similarly many other alterations inn the embodiments described herein which will fall within the spirit and scope of the present invention in it's several aspects described. The invention is limited only by the breadth of the claims below.

What is claimed is:

1. A computerized Internet Protocol Network Telephony (IPNT) call center, comprising:

a first processor in the call center coupled to a second processor in a data packet network (DPN) and to a second data link at the network level to the second processor other than the DPN, and adapted to receive and route incoming IPNT calls from the DPN; and a plurality of computers at operator workstations, each computer having a video display (PC/VDU) coupled to the first processor, the plurality of computers and the first processor connected on a local area network (LAN);

wherein the first processor receives, from the second processor on the second data link, data associated with the incoming IPNT calls sent on the DPN, and routes the incoming calls to individual ones of the computers at workstations at least partially based on the data received over the second data link.

2. The call center of claim 1 wherein the first processor communicates on the DPN by TCP/IP protocol.

3. The call center of claim 1 further comprising a customer information database connected to the LAN, and wherein the first processor matches the data received with information in the database, retrieves information from the database related to callers, and distributes the caller information to workstations to which associated calls are distributed.

4. The call center of claim 1 wherein the DPN is the Internet.

5. An Internet-Protocol Network Telephony (IPNT) call routing system, comprising:

a first processor connected to a data packet network (DPN) and to a second data link at the network level separate from the DPN; and a remote call center having a second processor connected to the DPN and to the second data link, and connected on a local area network (LAN) to a plurality of computers at operator workstations, each computer having a video display unit (PC/VDU);

wherein the first processor receives an IPNT call, elicits data about the call, forwards the call on the DPN to the second processor and the data on the second data link, and wherein the second processor receives, on the second data link, the data associated with the incoming IPNT call forwarded on the DPN, and routes the incoming calls to individual ones of the computers at workstations at least partially based on the data received on the second data link.

6. The call-routing system of claim 5 wherein the first and second processors communicate on the DPN by TCP/IP protocol.

7. The call-routing system of claim 5 further comprising a caller information database connected on the LAN, and wherein the second processor matches the data received on the second data network with information in the database, retrieves information from the database related to callers, and sends the information retrieved to workstations to which associated calls are routed.

8. The call routing system of claim 5 wherein the DPN is the Internet.

9. An initial Internet Protocol Network Telephony (IPNT) call processing system for routing incoming IPNT calls to selected destinations, comprising:

a processor connected to a data packet network (DPN) and receiving and forwarding incoming IPNT calls; and a second data link, at the network level, separate from the DPN connected to the first processor;

wherein the processor collects data from a call or caller, forwards the incoming calls to a remote call center on the DPN, and forwards the collected data to the call center over the separate second data link to the same call center.

10. The call-processing system of claim 9 wherein the elicited information is forwarded in TCP/IP protocol.

11. A method for routing an incoming Internet-Protocol Network Telephony (IPNT) call from a caller to a selected destination, comprising steps of:

(a) receiving the incoming IPNT call at a data packet network (DPN);

(b) eliciting information about the call or caller by a first processor in the DPN;

(c) selecting a destination for the incoming call; and (d) forwarding the incoming call over the DPN to a second processor at the selected destination, while sending the information about the caller to the second processor at the selected destination over a separate second data link at the network level.

* * * * *